United States Patent [19]

Aasgaard

[11] Patent Number: 5,741,099
[45] Date of Patent: Apr. 21, 1998

[54] SELF TAPPING BLIND SETTING RIVET ASSEMBLY

[75] Inventor: A. L. Pepper Aasgaard, Ohaha, Nebr.

[73] Assignee: ASAR Group, Inc., Omaha, Nebr.

[21] Appl. No.: 679,540

[22] Filed: Jul. 12, 1996

Related U.S. Application Data

[60] Provisional application No. 60/017,877 May 17, 1996.
[51] Int. Cl.⁶ ............................. F16B 13/04; B23P 11/02
[52] U.S. Cl. ............................. 411/29; 411/43; 29/525.06
[58] Field of Search ............................. 411/29, 43, 55, 411/34, 69, 70; 29/525.05, 525.06

[56] References Cited

U.S. PATENT DOCUMENTS

| | | | |
|---|---|---|---|
| 1,330,689 | 2/1920 | Drew | 411/29 X |
| 3,451,303 | 6/1969 | Biermann | 411/107 |
| 4,211,145 | 7/1980 | Dolch | 411/43 |
| 4,377,361 | 3/1983 | Frieberg | 411/161 |
| 4,436,467 | 3/1984 | Larsson et al. | 411/107 |
| 4,580,936 | 4/1986 | Francis et al. | 411/43 |
| 5,183,357 | 2/1993 | Palm | 411/29 |
| 5,246,323 | 9/1993 | Vernet et al. | 411/29 |
| 5,252,014 | 10/1993 | Andrews | 411/43 |
| 5,332,346 | 7/1994 | Shinjo | 411/107 |

FOREIGN PATENT DOCUMENTS

| | | | |
|---|---|---|---|
| 705797 | 5/1966 | Italy | 411/29 |
| 25535 | of 1898 | United Kingdom | 411/29 |
| 2147385 | 5/1985 | United Kingdom | 411/43 |

*Primary Examiner*—Neill R. Wilson
*Attorney, Agent, or Firm*—Suiter & Associates PC

[57] ABSTRACT

A self-tapping, blind setting rivet assembly to secure two or more work pieces together and suitable for power or hand tool application. The rivet assembly comprises a rivet body having a hollow tubular sleeve and an enlarged flattened head. The rivet body surrounds a mandrel comprising a shank which is terminated in a screw tip. This screw tip punctures, spreads, and self-taps an aperture in the work pieces through which the rivet sleeve passes. The mandrel's shank may have a weakened area of reduced diameter adjacent to the screw tip which allows detachment of shaft following application of sufficient axial force to the shank. This application of force causes the tapered shoulder section of the screw tip to compress and deform the rivet sleeve which sets the rivet.

11 Claims, 6 Drawing Sheets

SELF TAPPING BLIND SETTING RIVET ASSEMBLY

CROSS REFERENCE TO RELATED APPLICATIONS

The present application claims the benefit, under 35 U.S.C. §119, of U.S. Provisional application Ser. No. 60/017,877 filed May 17, 1996. Said Provisional application Ser. No. 60/017,877 is herein incorporated by reference in its entirety. This application is related to application Ser. No. 08/678,797, filed Jul. 12, 1996, now pending, and application Ser. No. 08/678,863, filed Jul. 12, 1997, now pending.

TECHNICAL FIELD

The present invention relates generally to blind setting rivets used for fastening together two or more sheets of material and specifically to self-tapping blind setting rivet assemblies used for that purpose.

BACKGROUND OF THE INVENTION

Blind setting rivets for fastening sheet metal work pieces or the like are well known to the art. Consequently, many variations of these rivets have been developed over the years. Some, such as the "pop rivet," require a pre-drilled hole. The added drilling step required by these rivets wastes time and causes unnecessary expense. Further, application of these rivets may at times be cumbersome. For example, in many applications, special jigs must be used to maintain exact alignment of the work pieces from the time the hole is drilled until the rivet can be applied.

Because of these and other limitations, self drilling blind setting rivets were developed. Rayburn (U.S. Pat. No. 3,750, 518), Murray et al. (U.S. Pat. No. 3,935,786), Rosenthal (U.S. Pat. No. 4,920,833), Shinjo (U.S. Pat. No. 4,998,853) and Stenberg et al. (U.S. Pat. No. 5,344,267) disclose self-drilling blind setting rivet type fasteners. These rivets all utilize specialized drill heads which are difficult to manufacture and thus expensive. Further, they may leave a burr on the outer layer of work piece materials. This burr may prevent proper seating of the rivet as it is applied. Improper seating may cause a weak joint. Szayer et al. (U.S. Pat. No. 4,990,042) discloses a self-drilling rivet having deburring ears to remove burrs during the drilling operation. However, the Szayer drill bit removes work piece material to create a hole for the rivet shank. This removed material may fall within an enclosed area causing a possible nuisance or hazard. Further, this material could be more efficiently used to increase application strength. A more desirable blind setting rivet would be self-tapping (using a screw tip) instead of self drilling (using a drill bit). This self-tapping rivet would leave uniform excurvations which would increase application strength. Additionally, a self-tapping rivet would be less expensive and easier to manufacture.

OBJECTS OF THE INVENTION

Therefore, it is an object of the present invention to provide a superior blind setting rivet which is self-tapping, leaving uniform excrutions which increase application strength and allow the rivet to seat properly.

It is another object of the present invention to provide a self-tapping blind setting rivet which is inexpensive and easy to manufacture.

SUMMARY OF THE INVENTION

The present invention provides a self-tapping, blind setting rivet assembly comprising a hollow rivet body surrounding a mandrel. The rivet body may have a hollow tubular sleeve and an enlarged flattened head adapted to abut the surface of a work piece. The mandrel may comprise a self-tapping screw tip having a diameter at least equal to the outside diameter of the lower end of the sleeve. The screw tip forms an aperture or hole through which the sleeve may be passed by separating and folding the material of one or more work pieces. A shoulder section adjacent to the screw tip may have an outer diameter greater than the inner diameter of the sleeve. This feature allows the shoulder section to radially compress and spread the lower end of the sleeve as the mandrel is retracted rearward relative to the rivet body during application. The mandrel may also comprise a shank which may have an area of reduced diameter spaced rearward from the shoulder section. This area may be sized to allow the screw tip and shoulder of the mandrel to be detached from the shank upon application of predetermined tensile force to the shank.

After application of the rivet, the screw tip may either be retained permanently within the rivet sleeve or allowed to drop off. In an embodiment wherein the screw tip is retained, the shoulder section of the mandrel preferably has a tapered upper face. Additionally, the shank may have an area of enlarged diameter spaced between the shoulder section and the area of reduced diameter. The shoulder section and area of enlarged diameter act together to retain the screw tip and shoulder section within the sleeve by creating an interference with the inner diameter of the lower end of the sleeve. This interference is created by deformation of the sleeve during application of the rivet.

In an embodiment wherein the screw tip is allowed to drop off, the shoulder section of the mandrel may have an upper face consisting of a tapered inner section and a flat-plate outer section. In this embodiment, the tapered inner section initially spreads the lower end of the sleeve. The flat-plate outer section then flattens the lower end of the sleeve against the work piece allowing the screw tip and shoulder section to drop off following application.

BRIEF DESCRIPTION OF THE DRAWINGS

The numerous objects and advantages of the present invention may be better understood by those skilled in the art by reference to the accompanying figures of which.

DETAILED DESCRIPTION OF AN EXEMPLARY EMBODIMENT

Figure 1:
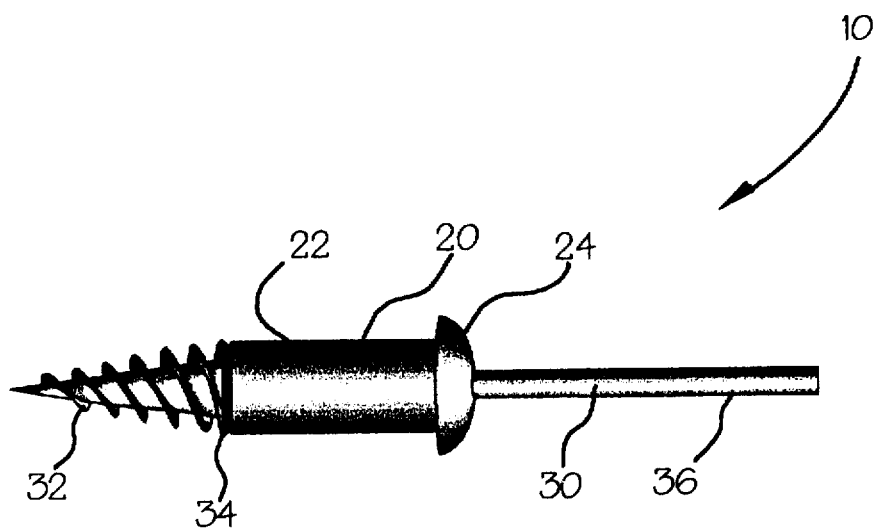
FIG. 1 is a side elevational view of the present invention disclosing a self-tapping, blind setting rivet assembly.

FIG. 1 discloses a self-tapping, blind setting rivet assembly 10 according to a preferred embodiment of the present invention. The rivet assembly 10 comprises two basic elements, a rivet body 20 having a hollow tubular sleeve 22 and an enlarged flattened head 24 surrounding a mandrel 30 having a self-tapping screw tip 32, shoulder section 34, and shank 36. The rivet body 20 may be made of steel, aluminum, plastic, composite, or other desirable rivet material. The mandrel 30 may be made of steel, aluminum, plastic, composite, or other material which is preferably of higher tensile strength than the rivet body material.

Figure 2:
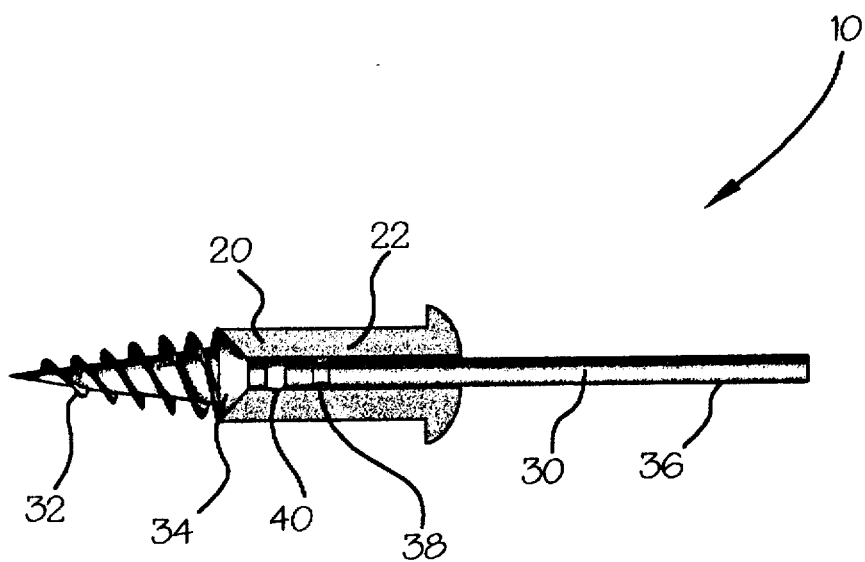
FIG. 2 is a partial cross-sectional side elevational view of the rivet assembly shown in FIG. 1 illustrating the rivet body and mandrel.

FIG. 2 provides a cross-sectional view of the rivet body 20 and discloses additional features of the mandrel 30. A weakened area of reduced diameter 38 may be formed on the mandrel shank 36 rearward from the shoulder section 34. This weakened area 38 is preferably sized to allow the screw tip 32 and shoulder section 34 to be detached from the shank 36 upon application of predetermined tensile force to the shank. Likewise, an area of enlarged diameter 40 may be formed on the shank 36 between the shoulder section 34 and the weakened area of reduced diameter 38. Preferably, this enlarged area 40 retains the screw tip 32 and shoulder section 34 within the sleeve 22 after application of the rivet by creating an interference with the inner surface of the sleeve. This interference may be created as the sleeve 22 is deformed during application of the rivet.

Figure 3:
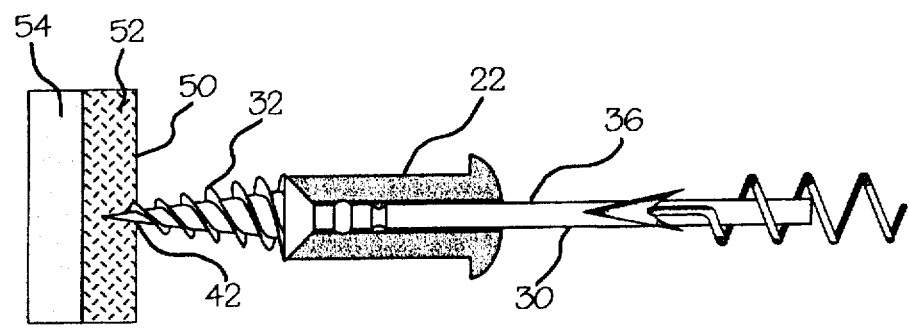
FIG. 3 is a partial cross-sectional side elevational view of the rivet assembly shown in FIG. 1 depicting the rivet assembly at the beginning of application.

FIGS. 3 through 6 illustrate the application of the self-tapping, blind setting rivet assembly 10, described in connection with FIG. 1, to fasten two or more work pieces (52 & 54) together. FIG. 3 is a partial cross-sectional side elevational view depicting the rivet assembly 10 at the beginning of application. The self-tapping screw tip 32 forms a hole or aperture by puncturing and separating the work piece materials 52 & 54. The screw tip 32 may be held normal to the outer work piece surface 50 while rotary motion is applied to the mandrel shank 36. This rotary motion threads the screw tip 32 into the workpiece materials 52 & 54 and expands them. In this manner, the screw tip 32 pulls itself through the work piece materials. Preferably, the screw tip 32 is essentially a standard sheet metal screw except that it may have a more pointed tip 42 to facilitate piercing of the outer work piece surface 50. The rear portion of the shank 36 may be designed for use with a specialized chuck (not shown) or various types of power or hand tools (not shown) to provide rotary motion and axial retraction to the mandrel 30.

Figure 4:
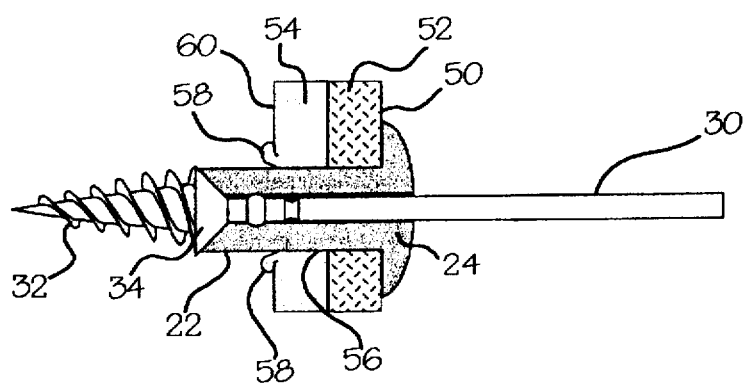
FIG. 4 is a partial cross-sectional side elevational view of the rivet assembly shown in FIG. 1 depicting the rivet assembly following the separation and folding of an aperture through the work piece materials by the screw tip.

FIG. 4 is a partial cross-sectional side elevational view of the rivet assembly 10 illustrated in FIG. 1 following the separation and folding of an aperture 56 through the work piece materials (52 & 54) by the screw tip 32. By using a power or hand tool (not shown), rotary motion may be applied to the mandrel 30 causing the self-tapping screw tip 32 to tap a hole or aperture 56 in adjacent work pieces 52 & 54. As the self-tapping screw tip 32 punctures and spreads the work piece materials, material 58 on the inner surface 60 of the innermost work piece 54 is separated and folded longitudinally. This folding increases the strength of the attachment compared to a drilled hole. Preferably, the outer diameter of the shoulder section 34 of the mandrel 30 is slightly larger than outer diameter of rivet sleeve 22 allowing the sleeve to pass through the hole or aperture formed. The enlarged flattened head 24 of the rivet body may abut on the outer surface 50 of the outer work piece 52 and may be retained there during application of the rivet by a riveting tool (not shown) or the like. The rivet head 24 may have a concave inner surface and a convex outer surface (see FIGS. 10 and 11).

Figure 5:
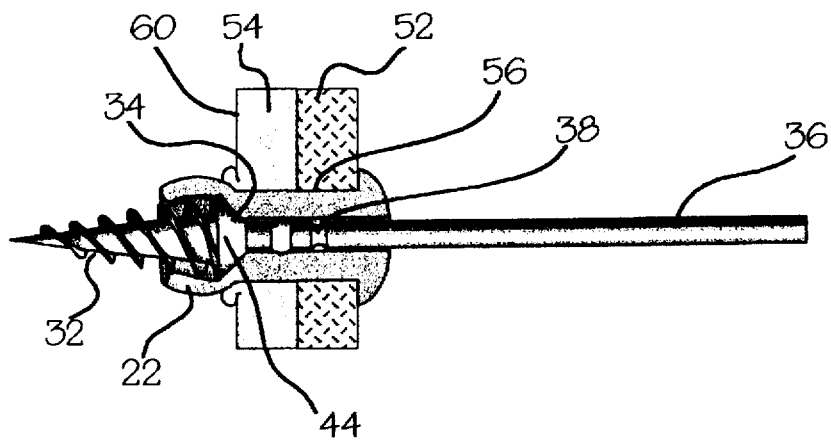
FIG. 5 is a partial cross-sectional side elevational view of the rivet assembly shown in FIG. 1 depicting the rivet assembly after the application of a rearward force on the mandrel shank.

FIG. 5 is a partial cross-sectional side elevational view of the rivet assembly 10 shown in FIG. 1 depicting the rivet assembly following the application of a rearward tension force on the mandrel shank 36. The rear portion of the shank 36 may be grasped by a riveting tool or the like (not shown), and axially retracted. This axial retraction of the mandrel shank 36 causes the mandrel's shoulder section 34 to deform the rivet sleeve 22. As the shoulder section 34 and screw tip 32 are drawn into the rivet sleeve 22, the tapered upper face 44 of the shoulder section spreads the sleeve radially. In this fashion, the rivet sleeve 22 may be spread until it will no longer pass through the aperture 56 created in the work pieces 52 & 54. The rivet sleeve 22 is pulled against the inner surface 60 of the innermost work piece 54. A weakened area of reduced diameter 38 may be sized to break at a predetermined tensile load. This load is preferably greater than the tensile load required to cause deformation of the rivet sleeve 22. FIG. 5 illustrates this deformation, which when coupled with the folding of the work piece material 54, forms a very strong attachment.

Figure 6:
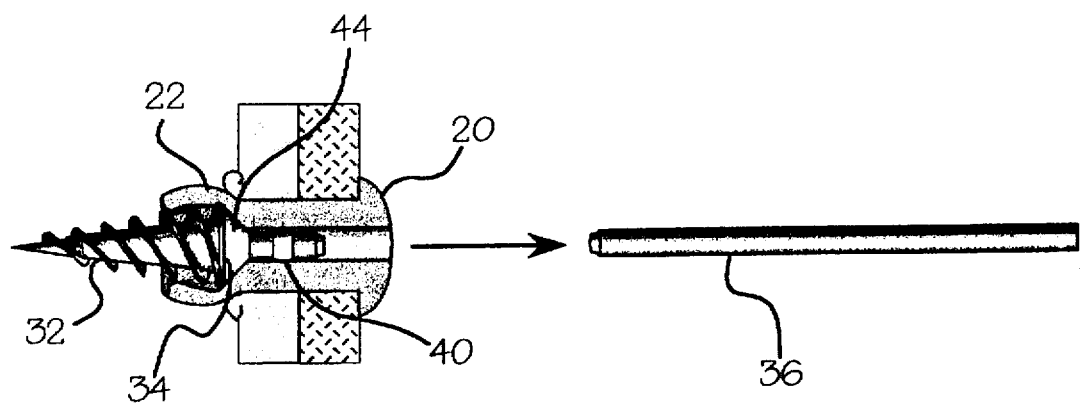
FIG. 6 is a partial cross-sectional side elevational view of the rivet assembly shown in FIG. 1 illustrating separation of the upper shank from the screw tip and shoulder section.

FIG. 6 is a partial cross-sectional side elevational view of the rivet assembly 10 shown in FIG. 1 depicting separation of the upper shank 36 from the screw tip 32 and shoulder section 34. In the present embodiment, the screw tip 32 and shoulder section 34 may be retained in the rivet sleeve 22 of the rivet body 20 due to an interference between the enlarged area 40 of the shank 36 and rivet sleeve. This interference may be created by deformation of the rivet sleeve 22 during application. Likewise, the tapered upper face 44 of the shoulder section 34 may deform the rivet sleeve 22 so as to encircle the screw tip 32 to provide additional retention of the screw tip after application of the rivet.

Figure 7:
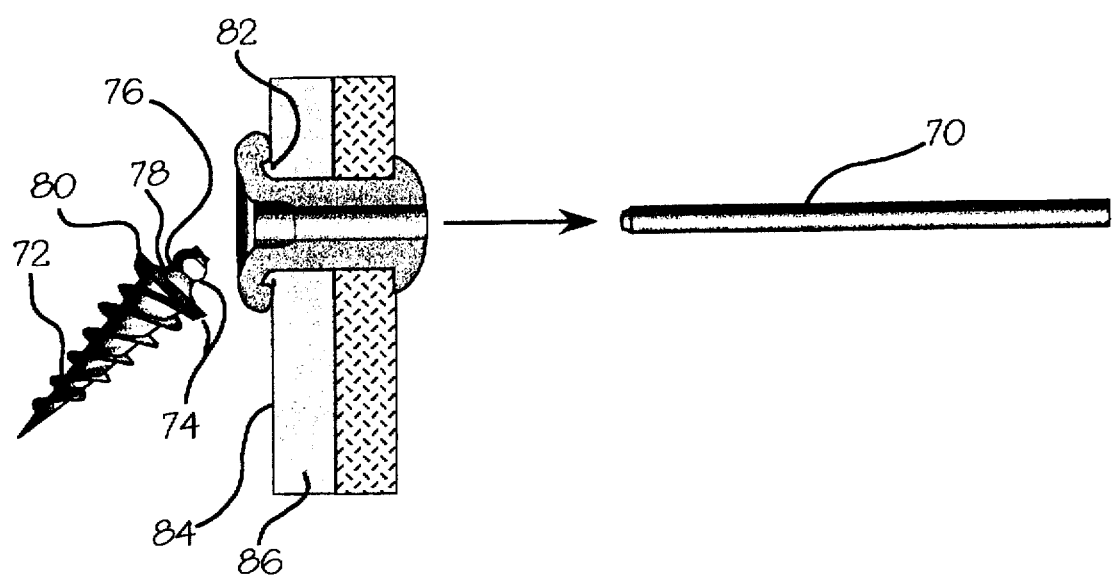
FIG. 7 is a partial cross-sectional side elevational view of an alternative embodiment of the present invention depicting the detachment of the screw tip and shoulder section following application.

FIG. 7 is a partial cross-sectional side elevational view of an alternative embodiment of the present invention depicting the detachment of the screw tip 72 and shoulder section 74 following application of the rivet. In this embodiment, wherein the screw tip 72 is allowed to drop off, the shoulder section 74 of the mandrel 70 may have an upper face 76 consisting of a tapered inner section 78 and a flat-plate outer section 80. Preferably, the tapered inner section 78 initially spreads the lower end of the rivet sleeve 82. The flat-plate outer section 80 then flattens the sleeve 82 against the inner surface 84 of the innermost work piece 86 allowing the screw tip 72 and shoulder section 74 to drop off following application of the rivet.

Figure 8:
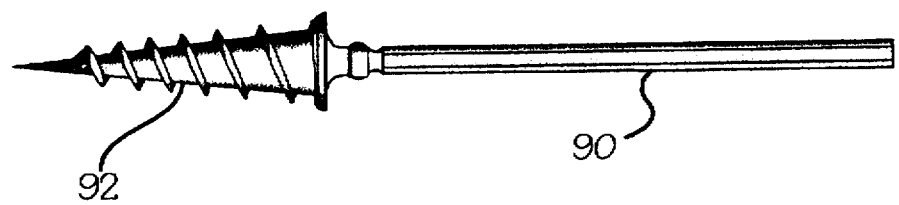
FIG. 8 is a side elevational view of an alternative embodiment of the mandrel having a modified six-sided shank and a modified screw tip.
Figure 9:
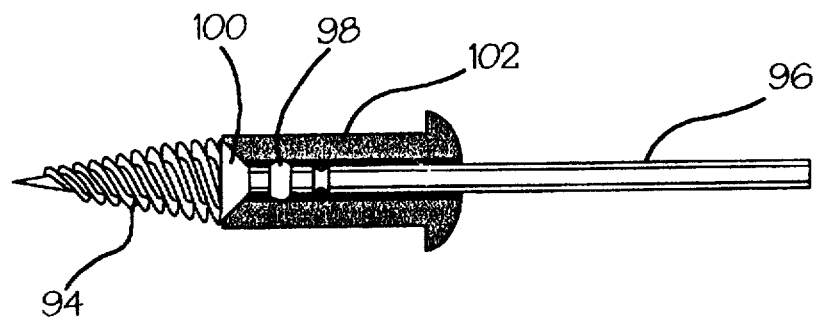
FIG. 9 is a partial cross-sectional side elevational view of yet another embodiment of the present invention having a modified six-sided mandrel shank with a modified screw tip.

FIGS. 8 and 9 depict alternative embodiments of the mandrel having modified six-sided shanks 90 & 96. These shanks 90 & 96 may be desirable for heavy duty applications. The shank 90 illustrated in FIG. 8 may be formed without an enlarged area to allow the screw tip 92 to drop off after application. Alternatively, the shank 96 illustrated by FIG. 9 may have an enlarged area 98 and shoulder section 100 (as described in connection with FIG. 6) to allow the shoulder section and screw tip to be retained within the rivet sleeve 102 after application. While a six-sided shank is illustrated, the shank may have a greater or lesser number of sides depending on the application.

Screw tips having different points and thread pitches may be used depending on the materials being joined. For example, FIG. 8 depicts a mandrel having a modified screw tip 92 suitable for joining plastic materials. This screw tip may have a lower thread pitch than the screw tip 32 shown in FIG. 1. Further, the width or spacing of the threads of this screw tip 92 may increase as they progress up the screw tip away from the point. Likewise, FIG. 9 depicts a modified screw tip 94 having a higher thread pitch than the screw tips 32 & 92 shown in FIGS. 1 and 8. This screw tip 94 would cut through the workpiece materials (not shown).

Figure 10:
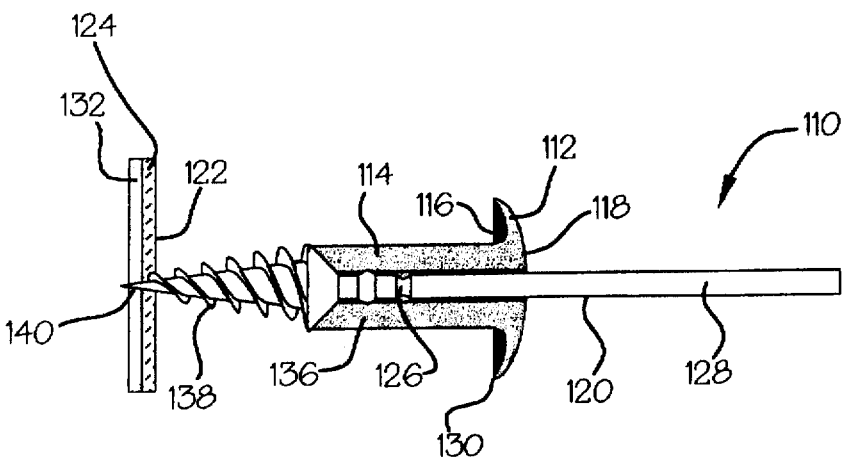
FIG. 10 is a partial cross-sectional side elevational view of an embodiment of the present invention wherein the enlarged flattened head of the rivet body may have a concave inner surface and a convex outer surface.
Figure 11:
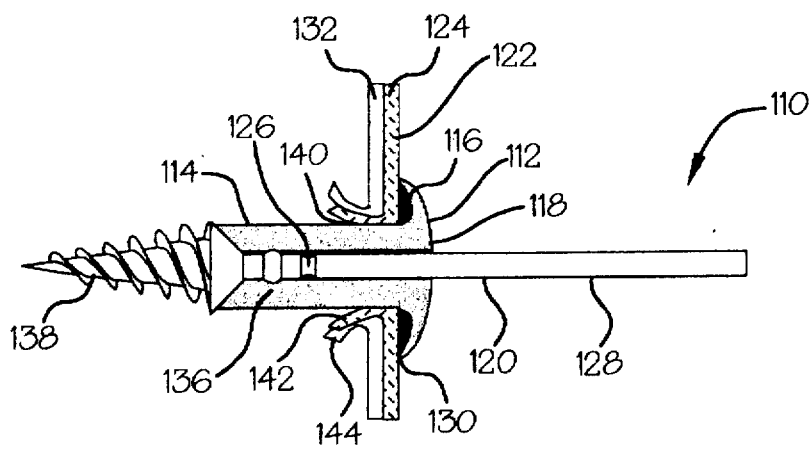
FIG. 11 is a partial cross-sectional side elevational view of the rivet assembly shown in FIG. 10 depicted after piercing of an aperture through adjacent work pieces.
Figure 12:
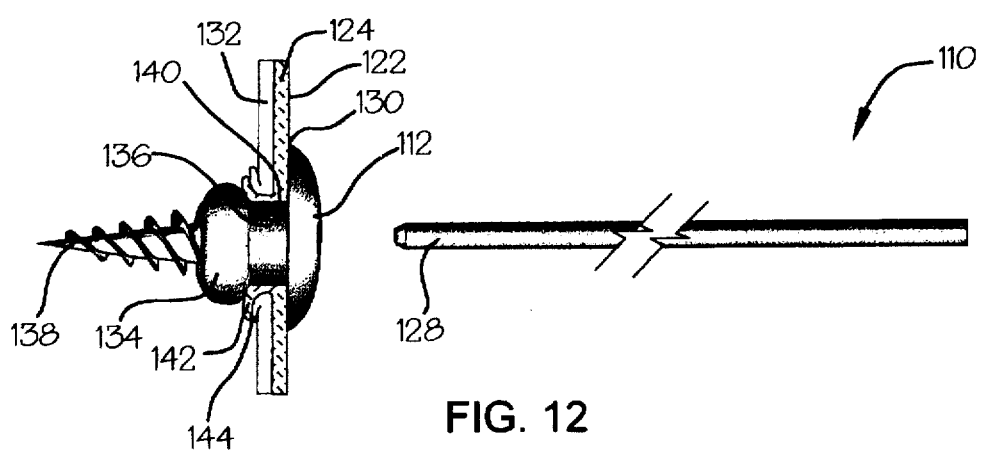
FIG. 12 is a side elevational view of the rivet assembly shown in FIG. 10 depicted after application.

FIGS. 10, 11 and 12 illustrate a self-tapping blind setting rivet assembly 110 according to another embodiment of the present invention wherein the enlarged flattened head 112 of the rivet body 114 may have a concave inner face 116 and a convex outer face 118. Preferably, as the rivet assembly 110 is applied, axial retraction of the mandrel 120 pulls the enlarged flattened head 112 against the outer surface 122 of the outer work piece 124, compressing and flattening its concave inner face 116. When the weakened area 126 on the mandrel 120 fractures and the shank 128 is released, the concave inner face 116 attempts to retain its original shape causing the rim 130 of the inner face to apply a spring-like force to the outer surface 122 of the outer workpiece 124. This force holds the work pieces (124 & 132) snugly between the head 112 and deformed portion 134 of the rivet body's sleeve 136. Although a rivet head 112 having a concave inner face 116 is shown in combination with a self-tapping blind setting rivet assembly according to the present invention, it would be obvious to one skilled in the art that this rivet head design could be applied to other types of rivets such as pop rivets, self-drilling rivets, or the like to provide superior retention of those rivet assemblies.

FIGS. 11 and 12 further illustrate how folding of the work piece materials may increase the strength of the attachment compared to a drilled hole. Here, the self-tapping blind setting rivet assembly 110 is used to join two relatively thin work pieces (124 & 132). As the self-tapping screw tip 138 punctures and expands the work piece materials (124 & 132) to create a hole or aperture 140, material 142 from the outer workpiece 124 may be folded through the aperture and wrapped around material 144 from the inner work piece 132. This material (142 & 144), may then be compressed beneath the deformed area 134 of the rivet body sleeve 136 and utilized to provide additional retention of the work pieces (124 & 132).

In view of the above detailed descriptions of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. A self-tapping, blind setting rivet assembly comprising:

(a) a hollow rivet body having a tubular sleeve and an enlarged flattened head adapted to abut the surface of a work piece; and (b) a mandrel disposed longitudinally within said rivet body comprising a screw tip having a diameter at least equal to the outer diameter of said sleeve so that said sleeve may pass through an aperture formed by said self-tapping screw tip separating and folding one or more work pieces, a shoulder section adjacent to the screw tip having an outer diameter greater than the inner diameter of said sleeve so that the shoulder section radially compresses and spreads the lower end of said sleeve as said mandrel is retracted rearward relative to said rivet body, and a shank having an area of reduced diameter spaced rearward from the shoulder section and sized to allow the screw tip and shoulder section of said mandrel to be detached from the shank upon application of predetermined tensile force applied to the shank.

2. The rivet assembly according to claim 1, wherein said mandrel further comprises a shoulder section having a tapered upper face, and an area of enlarged diameter spaced between the shoulder section and the area of reduced diameter of the shank so that said shoulder section and said area of enlarged diameter act together to retain the screw tip and shoulder section within the sleeve due to interference with the inner diameter of the said sleeve caused by deformation of the sleeve during application.

3. The rivet assembly according to claim 1, wherein said mandrel further comprises a shoulder section having an upper face consisting of a tapered inner section and a flat-plate outer section wherein said tapered inner section initially spreads the lower end of said sleeve and the flat-plate outer section flattens said lower end of said sleeve against the work piece allowing said screw tip and shoulder to drop off following application.

4. The rivet assembly according to claim 1, wherein said shank has a six-sided cross-sectional area.

5. The rivet assembly according to claim 1, wherein said enlarged flattened head comprises a concave inner face wherein the concave inner face compresses and becomes flattened following application.

6. A process for securing work pieces together, comprising:

(a) aligning one or more work pieces which are to be secured together;

(b) pulling a blind setting rivet assembly having a hollow rivet body and a mandrel within said rivet body through said aligned one or more work pieces with a self-tapping screw tip wherein said mandrel includes a shoulder section adjacent to the screw tip having an outer diameter greater than the inner diameter of said sleeve; and (c) setting said blind setting rivet assembly wherein said shoulder section radially compresses and spreads the lower end of said sleeve as said mandrel is retracted rearward relative to said rivet body and wherein said shank has an area of reduced diameter spaced rearward from the shoulder section and sized to allow the screw tip and shoulder section of said mandrel to be detached from the shank upon application of predetermined tensile force applied to the shank, whereby said one or more aligned work pieces are at least partially secured together by said rivet assembly.

7. The process for securing work pieces together of claim 6, wherein said self-tapping screw tip has an outer diameter greater than the diameter of said blind setting rivet assembly.

8. The process for securing work pieces together of claim 6 wherein said hollow rivet body has a tubular sleeve.

9. The process for securing work pieces together of claim 8 wherein said hollow rivet body has an enlarged head.

10. The process for securing work pieces together of claim 9 wherein said enlarged head is flattened and adapted to abut the surface of a work piece.

11. The process for securing work pieces together of claim 6 wherein said mandrel includes a screw tip adapted to at least partially fold a portion of one or more work pieces as it pulls said mandrel through said one or more work pieces.

* * * * *